United States Patent

Rogers et al.

[11] Patent Number: 5,910,363
[45] Date of Patent: Jun. 8, 1999

[54] POLYESTERS OF 2,6-NAPHTHALENEDICARBOXYLIC ACID HAVING IMPROVED HYDROLYTIC STABILITY

[75] Inventors: Martin Emerson Rogers, Blountville; Sarah Jayne Webb, Gray, both of Tenn.

[73] Assignee: Eastman Chemical Company, Kingsport, Tenn.

[21] Appl. No.: 09/073,514

[22] Filed: May 6, 1998

Related U.S. Application Data

[62] Division of application No. 08/866,468, May 30, 1997.
[51] Int. Cl.[6] ............................... D02G 3/00; C08F 20/00
[52] U.S. Cl. ......................... 428/365; 528/298; 528/302; 528/307; 528/308; 528/308.6; 528/310; 528/322; 525/437; 525/440; 525/444; 428/365; 428/370
[58] Field of Search ..................................... 528/298, 302, 528/307, 308, 308.6, 310, 322; 525/437, 440, 444; 428/365, 370

[56] References Cited

U.S. PATENT DOCUMENTS

| | | | |
|---|---|---|---|
| 3,030,335 | 4/1962 | Goldberg | 260/47 |
| 3,317,466 | 5/1967 | Caldwell et al. | 260/47 |
| 4,829,681 | 5/1989 | Josef | 34/123 |
| 5,169,499 | 12/1992 | Eagles et al. | 428/178 |
| 5,246,992 | 9/1993 | Wick et al. | 524/195 |
| 5,405,685 | 4/1995 | Patel | 428/229 |

FOREIGN PATENT DOCUMENTS

| | | |
|---|---|---|
| 0 527 371 | 2/1993 | European Pat. Off. . |
| 1770495 | 11/1971 | Germany . |
| 1-56041 | 11/1989 | Japan . |

OTHER PUBLICATIONS

Derwent Abstract JP 5163612 (& translation) Jun., 1993.
JP Kokai No. 49(1974)–61409 (JP56 27639B) Jun. 1994.

*Primary Examiner*—Sam A. Acquah
*Attorney, Agent, or Firm*—Betty J. Boshears; Harry J. Gwinnell

[57] ABSTRACT

This invention relates to a polyester composition comprising:

(A) 95 to 99.90% by weight of a polyester comprising from about 85 to 100 mole % of 2,6-naphthalenedicarboxylic acid and 85 to 100 mole % of at least one aliphatic glycol having from 2 to 16 carbon atoms, based on the total mole percentage for the glycol portion and for the acid portion of said polyester each equalling 100 mole %, and (B) 0.1 to 5.0% by weight of one or more polymeric carbodiimides.

These polyester compositions result in improved hydrolytic stability in end products such as fiber, monofilament, films, thermoformed articles, containers and sheeting based on naphthalenedicarboxylic acid and ethylene glycol.

21 Claims, No Drawings

POLYESTERS OF 2,6-NAPHTHALENEDICARBOXYLIC ACID HAVING IMPROVED HYDROLYTIC STABILITY

This application is a Divisional of Prior application Ser. No. 08/866,468 filed May 30, 1997, pending.

FIELD OF THE INVENTION

This invention relates to polyesters or copolyesters of 2,6-naphthalenedicarboxylic acid having improved hydrolytic stability when prepared using certain carbodiimides.

BACKGROUND OF THE INVENTION

The resistance of a polyester to hydrolysis greatly depends on the number of carboxyl end groups per unit weight. It is known that an improvement in resistance to hydrolysis can be achieved by closing off these carboxyl end groups by chemical reactions. Reactions with aliphatic, aromatic and also cycloaliphatic mono-, bis- or polycarbodiimides have already been described in several incidences as such "closing-off" of the carboxyl end groups.

Thus, for example, German Offenlegungsschrift 1,770,495 describes stabilized polyethylene glycol terephthalates which have been obtained by the addition of polycarbodiimides. Because of the slower rate of reaction which is generally to be observed with polycarbodiimides, it is necessary to endure a relatively long residence time of the polycarbodiimide in the polyester melt. For this reason, polycarbodiimides have already been added during the polycondensation reaction of the polyesters. However, a number of disadvantages are associated with such a procedure. For example, a large number of by-products are formed because of the long residence time, and where relevant, the actual polycondensation reaction of the polyester is also impeded.

Japanese Published Specification 1-15604/89 requires the use of an excess of 0.005 to 1.5% by weight of the monocarbodiimide specifically recommended. The Japanese Published Specification furthermore states that the use of polycarbodiimides does not correspond to the prior art already achieved.

Japanese Laid Open Document P 05163612 A and JP 05627639 B disclose the use of monomeric 0.5–0.25 weight % of N,N'-bis(2,6-diisopropylphenyl)carbodiimide as preferred to stabilize polyesters of poly(ethylene naphthalate). However, in section [0017] of Japanese Laid Open Document P 05163612 A, it is clearly stated that "Carbodiimide compounds with multiple functional groups such as biscarbodiimides are not preferable, since they cause rapid, high-degree polymerization of poly(ethylene naphthalate) so that it will be difficult to knead together with poly(ethylene naphthalate)."

Disclosure of the use of monomeric 0.5–0.25 wt % of N,N'-bis(2,6-diisopropylphenyl)carbodiimide to stabilize polyesters of poly(ethylene 2,6-napthalenedicarboxylate) is found in JP 05163612 A and JP 05627639 B to Teijin LTD.

U.S. Pat. No. 5,246,992 discloses the use of a combination of mono- and/or bis- carbodiimides with polycarbodiimides as hydrolytic stabilizers for polyesters. The main constituent of the polyesters disclosed is terephthalic acid, and other, preferably para or trans compounds, such as for example, 2,6-naphthalenedicarboxylic acid, or else p-hydroxybenzoic acid. Example 3 of this patent discloses a comparative example of the use of a polycarbodiimide (15% of the polycarbodiimide in polyethylene terephthalate) alone with the polymer material. Reduced thermal and hydrolytic resistance compared to the prior art was observed in this example. Also, col. 6, lines 49–51 of U.S. Pat. No. 5,246,992, states that the sole use of polycarbodiimides did not lead to the required stabilization.

U.S. Pat. No. 4,829,681 discloses a paper machine cloth comprising interwoven machine direction and cross-machine direction yarns prepared from terephthalic acid and ethylene glycol with improved resistance to hydrolysis.

U.S. Pat. No. 5,169,499 also discloses a paper machine cloth comprising interwoven machine direction and cross-machine direction polyester yarns based on polyesters prepared from terephthalic acid, isophthalic acid, and 1,4-cyclohexanedimethanol with improved resistance to hydrolysis. The polyesters disclosed in this invention are stabilized by commercial polymeric carbodiimides manufactured by Rhein Chemie Corporation under the tradenames Staboxal™ P-100. Rhein Chemie Corporation (Germany) manufactures a variety of carbodiimide products which are used to improve the resistance of polyester products to hydrolysis.

None of the above described references fully address the problem of lack of hydrolytic stability in PEN compositions.

Therefore, there is a need in the art for PEN compositions with improved hydrolytic stability.

SUMMARY OF THE INVENTION

This invention relates to polyester compositions having improved hydrolytic stability useful as fiber, monofilament, films, thermoformed articles, containers and sheeting based on naphthalenedicarboxylic acid, especially, 2,6-naphthalenedicarboxylic acid and ethylene glycol (PEN).

More particularly, this invention relates to a polyester composition comprising:

(A) 95.0 to 99.0% by weight of one or more polyesters comprising from about 85 to 100 mole % of 2,6-naphthalenedicarboxylic acid and 85 to 100 mole % of at least one aliphatic glycol having from 2 to 16 carbon atoms, based on the total mole percentage for the glycol portion and for the acid portion of the polyester each equalling 100 mole %, and (B) 0.1 to 5.0% by weight of one or more polymeric carbodiimides, and optionally, (C) 0 to 90% by weight, preferably 5 to 75.0%, more preferably 5 to 50%, even more preferably 5 to 35% by weight, by weight of at least one terephthalate-based homopolymer, copolymer, or mixtures thereof.

This invention also relates to an article of paper machine fabric prepared with the polyester composition of the invention.

The object of this invention is to provide new stabilized polyester compositions which are especially effective at improving the hydrolytic stability of polyester products prepared from naphthalenedicarboxylic acid.

DESCRIPTION OF THE INVENTION

Exceptional stability to hydrolysis is achieved by blending polymeric carbodiimides with naphthalenedicarboxylic acid-based polyesters and/or copolyesters and subsequently extruding the blend to obtain the stabilized polyester composition.

The polyester compositions disclosed here are prepared from a polyester composition comprising:

(A) 95.0 to 99.90%, preferably 97.0 to 99.80%, by weight of a polyester comprising from about 85 to 100 mole % of 2,6-naphthalenedicarboxylic acid and 85 to 100 mole % of at least one aliphatic glycol having from 2 to 16 carbon atoms, based on the total mole percentage for the glycol portion and for the acid portion of said polyester each equalling 100 mole %, and (B) 0.1 to 5.0%, preferably 0.2 to 3.0%, by weight of one or more polymeric carbodiimides.

Also preferred are polyester compositions comprising:

(A) 10 to 90% by weight of a polyester comprising from about 85 to 100 mole % of 2,6-naphthalenedicarboxylic acid and 85 to 100 mole % of at least one aliphatic glycol having from 2 to 16 carbon atoms, based on the total mole percentage for the glycol portion and for the acid portion of said polyester each equalling 100 mole %, (B) 0.1 to 5.0% by weight of one or more polymeric carbodiimides, and (C) 5 to 75%, preferably 5 to 50%, more preferably 5 to 35%, by weight of at least one terephthalate-based homopolymer, or mixtures thereof (the secondary polyester resins of this invention).

Particularly preferred PEN polyesters are prepared from 90 to 100 mole % 2,6-naphthalenedicarboxylic acid units and at least 100 to 90 mole % ethylene glycol units or 1,4-cyclohexanedimethanol.

The most preferred poly(ethylene naphthalenedicarboxylate) [PEN] polymers of this invention are generally based on 2,6-naphthalenedicarboxylic acid but may be based on naphthalenedicarboxylic acid containing up to about 25 mole % of one or more naphthalenedicarboxylic acid isomers such as the 1,2-, 1,3-, 1,4-, 1,5-, 1,6-, 1,7-, 1,8-, 2,3-, 2,4-, 2,5-, 2,7-, or 2,8-isomers. Other preferred PEN-based polymers are ones based primarily on 1,4-, 1,5-, or 2,7-naphthalenedicarboxylic acid.

The preferred poly(1,4-cyclohexylenedimethyene naphthalenedicarboxylate) (PCDN) polymers are based on the above described naphthalenedicarboxylic acids or their lower alkyl esters and cis or cis/trans mixtures of 1,4-cyclohexanedimethanol. Polymers (PCDN) based on 2,6-naphthalenedicarboxylic acid and a 30/70 cis/trans mixture of 1,4-cyclohexanedimethanol melts at a very high temperature (~350° C.) and are thus difficult to process. Similar polymers based on the cis isomer or cis/trans mixture containing up to about 50% trans 1,4-cyclohexanedimethanol melt at more reasonable temperatures and thus are preferred.

Another way of decreasing the melting points of these high melting polyesters is to include up to about 15 mole %, preferably less than 10 mole % and more preferably less than 10 mole % of modifying dicarboxylic acids or glycols.

Suitable modifying dicarboxylic acids for use in the PEN or PCDN polyesters or copolyesters of the invention generally contain 4 to about 36 carbon atoms and may include fumaric, succinic, adipic, glutaric, azelaic, sebacic, dimer, terephthalic, isophthalic, resorcinoldiacetic, diglycolic, 4,4'-oxybis [benzoic], biphenyldicarboxylic, cis or trans-1,4-cyclohexanedicarboxylic, 4,4'-methylenedibenzoic, trans-4,4'-stilbenedicarboxylic acid sulfoisophthalic acid and the like.

Modifying glycols for use in the PEN or PCDN polyesters or copolyesters of the invention may contain from about 2 to 12 carbon atoms and may be aliphatic or cycloaliphatic in nature. Suitable modifying glycols include ethylene glycol, 1,3-propanediol, 1,4-butanediol, 1,5-pentanediol, 1,6-hexanediol, 2,2-dimethyl-1,3-propanediol, 1,10-decanediol, diethylene glycol, 2,2,4,4-tetramethyl-1,3-cyclobutanediol, cis- or trans-1,4-cyclohexanedimethanol and the like.

The preferred glycols for use in the naphthalenedicarboxylic acid-containing polyesters and copolyesters of the invention are ethylene glycol and 1,4-cyclohexanedimethanol. Ethylene glycol is particularly preferred.

Preferably, the desired PEN or PCDN polyesters or copolyesters have an inherent viscosity of at least 0.4 dL/g, and more preferably, 0.6 dL/g to 1.5 dL/g.

The PEN or PCDN polyesters of this invention are readily prepared from the appropriate dicarboxylic acids or their lower alkyl esters and the appropriate glycol or glycol mixtures using typical polycondensation reaction conditions. They may be made by either batch or continuous processes. Typical polyesterification catalysts which may be used include titanium alkoxides, dibutyl tin dilaurate, combinations of zinc, manganese, or magnesium acetates or benzoates with antimony oxide or antimony triacetate and the like.

These PEN or PCDN polyesters may be made by either melt phase or solid state polycondensation methods. A preferred way to make the polyesters is to prepare polymers with an I.V. value of about 0.3 dL/g to about 0.5 dL/g in the melt phase and then to further increase the molecular weight of the polymer by solid state polycondensation of polymer in powder, granule or pellet form at a temperature above the glass transition temperature but below the melting point of the polyester.

The polyester compositions of the invention may include blends of PEN or PCDN polyesters with secondary polyester resins as defined below.

Secondary polyester resins useful in the blend of this invention (Component C) are well known and are commercially available. Secondary polyester resins are defined for the purposes of this invention as polyester resins which are not PEN or PCDN polyesters previously described.

Polyesters suitable for the secondary polyester resins of the invention include, in general, linear, saturated condensation products of diols and dicarboxylic acids or reactive derivatives thereof. Preferably, they are polymeric glycol esters of terephthalic acid and isophthalic acid. The secondary polyester resins may include any filament forming, moldable or extrudable polyester, however.

Terephthalate-based polyester resins are preferred. These may be, but are not limited to, PCT, PBT, PCT, all as defined below, and any copolyester thereof. Examples of these are: PETG [a glycol-modified poly(ethylene terephthalate) copolyester, preferably modified with 1,4-cyclohexanedimethanol]; PET [poly(ethylene terephthalate)]; PCT [poly(cyclohexanedimethylene) terephthalate]; CPET [crystallized PET]; PCTA and PCTG [the acid- and glycol-modified copolyesters of PCT, respectively].

The dicarboxylic acid component of the secondary polyester resins may contain up to about 15 mole % of one or more different dicarboxylic acids other than terephthalic acid, or suitable synthetic equivalents such as dimethyl terephthalate. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acids to be included with terephthalic acid are: phthalic acid, isophthalic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like. Copolyesters may be prepared from one or more of the above dicarboxylic acids.

In addition, the secondary copolyester resins may optionally be modified with up to 15 mole percent, preferably up to 10 mole percent and more preferably, up to 5 mole percent, of one or more different diols having from 2 to 20 carbon atoms. Such additional diols include cycloaliphatic diols preferably having 6 to 20 carbon atoms or aliphatic diols preferably having 2 to 20 carbon atoms. Examples of such diols to be included with ethylene glycol and diethylene glycol are: triethylene glycol, 1,3-propanediol, 1,4-butanediol, 1,5-pentanediol, 1,6-hexanediol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), 1,3-hexanediol, 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4-hydroxypropoxyphenyl)-propane. Copolyesters may be prepared from two or more of the above diols.

The secondary polyesters of the invention preferably have an inherent viscosity of 0.4 to 1.5 dL/g, more preferably 0.5 to 1.1 dL/g. Copolyesters containing substantially only ethylene glycol, 1,4-cyclohexanedimethanol and terephthalic acid are preferred.

It should be understood that use of the corresponding acid anhydrides, esters, and acid chlorides of these acids is included in the term "dicarboxylic acid".

The PEN, PCDN, the secondary polyesters of this invention, and the final polyester compositions of this invention may contain conventional additives and ingredients which do not deleteriously affect their end use. For example, additives such as fillers, lubricants, light and heat stabilizers, extrusion aids, dyes, pigments and the like may be used.

The polyester compositions of the invention are readily spun into monofilaments using conventional procedures well known in the art. Such fibers have excellent resistance to hydrolytic degradation at elevated temperatures, excellent dimensional stability, and resistance to deformation.

For the purposes of this invention, the term "fiber" refers to a shaped polymeric body of high aspect ratio capable of being formed into two or three dimensional articles as in woven or nonwoven fabrics. Fiber further refers to staple, multifilament or monofilament forms. Also, for the purposes of this invention, the melting point is determined by any means known in the art. The preferred method of determining melting point and glass transition temperature is by the differential scanning calorimetry (DSC) well known in the art. The melting point can be specifically defined in this context as the temperature of the highest peak on the endotherm of the plot produced via DSC.

Preferred polycarbodiimides of the invention have either the following structure A:

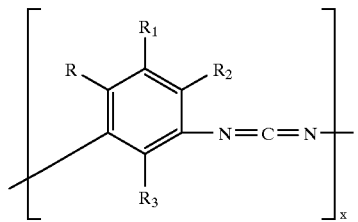

wherein R, $R_1$, $R_2$ and $R_3$ is selected from the group consisting of: —H, —$CH_3$, —$CH_2CH_3$, —$CH_2CH_2CH_3$, —$CH(CH_3)_2$, —$C(CH_3)_3$, —$CH(CH_2CH_3)_2$, —Cl, —$OCH_3$; preferably where at least one of R, $R_1$, $R_2$ and $R_3$ is —$CH(CH_3)_2$, and wherein x is from 2 to 80, more preferably 2 to 60, and even more preferably 2 to 25, particularly 10–15, or the general structure B:

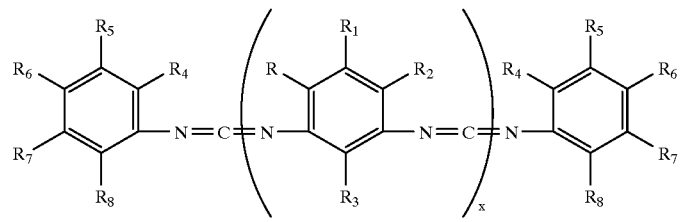

wherein R, $R_1$, $R_2$, $R_3$, $R_4$, $R_5$, $R_6$, $R_7$ and $R_8$ is selected from the group consisting of: —H, —$CH_3$, —$CH_2CH_3$, —$CH_2CH_2CH_3$, —$CH(CH_3)_2$, —$C(CH_3)_3$, —CH$(CH_2CH_3)_2$, —Cl, —$OCH_3$, and wherein x is from 2 to 80, more preferably 20 to 60 and even more preferably 30 to 50, particularly 35 to 45.

It is preferable that the polycarbodiimides of the invention are not used in combination with mono- or bis-carbodiimides.

It is preferable for both Structures A and B that at least one of the respective R groups is an isopropyl group.

A particularly preferred polycarbodiimide is a commercially available aromatic polycarbodiimide which is substituted by isopropyl groups in the o-position relative to the carbodiimide groups, i.e., in the 2,6- or 2,4,6-position on the benzene nucleus.

Particularly useful polycarbodiimides have a number average molecular weight of 3000 to 10,000, more preferably 5000 to 10,000.

Particularly preferred polycarbodiimides include those commercially available under the trade name "STABAXOL P" or "STABAXOL P-100" respectively of Rhein Chemie, of Rheinau GmbH, West Germany. The polycarbodiimides commercially available under the trade name "STABAXOL P" or "STABAXOL P-100" may also be added in master batches, for example, Stabaxol KE 7646 (15% Stabaxol P100 in poly(ethylene terephthalate), Stabaxol KE 9291 (15% Stabaxol KE 8059 (8% Staboxol and 7% Stabaxol P100 in PET), Stabaxol KE 9193 (15% Stabaxol P100 in PBT [poly(butylene terephthalate)], Stabaxol KE 8993 (20% Stabaxol P100 in polyamide 6), Rhenogran P50 (50% Staboxol P in ethylvinylacetate).

More particularly polycarbodiimides of the following structures are preferred:

Polymeric carbodiimide structure C =

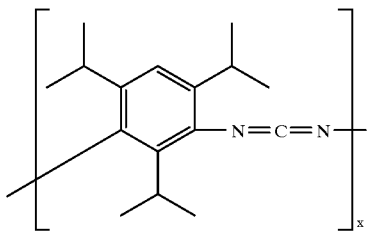

wherein x is 13.

Polymeric carbodiimide Structure D=

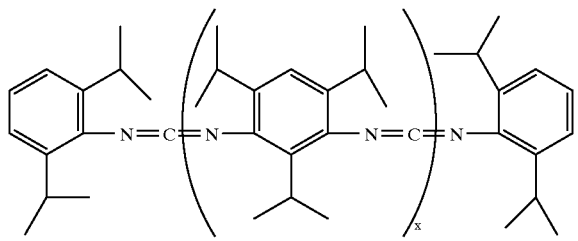

wherein x is 40.

The preferred polyester compositions of our invention are blended with appropriate polymeric carbodiimide stabilizers, extruded into filaments, fibers, films, containers or sheeting and possibly oriented to obtain the polyester fibers and monofilaments with improved wet heat resistance.

Polyesters prepared from the dicarboxylic acids and glycols of this invention have reduced heat resistance but when treated as described by our invention exhibit improved hydroytic stability.

The copolyesters of this invention may be still further modified by the incorporation of blend modifiers. For example, polyamides such as nylon 6,6 from Du Pont, poly(ether-imides) such as Ultem™ poly(ether-imide) from General Electric, polyphenylene oxides such as poly(2,6-dimethylphenylene oxide) or poly(phenylene oxide)/polystyrene blends such as the Noryl resins from General Electric, polyesters, polyphenylene sulfides, polyphenylene sulfide/sulfones, poly(ester-carbonates), polycarbonates such as Lexan polycarbonate from General Electric, polysulfones, polysulfone ethers, poly(ether-ketones) of aromatic dihydroxy compounds may be used as blend modifiers to modify properties or to reduce flammability. The aromatic dihydroxy compounds used to prepare these polymers are disclosed in U.S. Pat. Nos. 3,030,335 and 3,317,466.

The copolyesters of this invention may also contain conventional flame retardants such as phosphorus or halogen compounds and/or antimony oxide, or fillers such as talc or mica, or reinforcing agents such as glass fiber, Kevlar™, carbon fiber, antioxidants such as Irganox™ 1010 or Ethanox™ 330, or antiblock or slip additives such as silica.

The polymeric carbodiimides can be blended with the final polyester composition to be stabilized either just prior to extrusion or molding of the polymer or they can be dispersed into a masterbatch concentrate which can then be blended with the polyester composition to be stabilized. The initial concentrate is preferably PEN-based or PCDN-based but could potentially be prepared from poly(ethylene terephthalate)(PET-based), poly(butylene terephthalate) (PBT), poly(cyclohexanedimethylene) terephthalate or other polyester resins known in the art.

The polyester compositions of the invention are useful in the manufacture of paper machine fabric such as belting, tire cord belting materials, possible other belting uses, electrical films and formed devices, containers or packaging for electronic devices or any device requiring lengthy exposure to elevated temperatures. It has long been known that the action of the carbodiimide stabilizer on the polyester materials is to react with carboxyl end groups thus preventing these acid groups from catalyzing the hydrolytic breakdown of the polyester monofilaments during exposure of the polyester to the high temperatures of the paper manufacturing and tire manufacturing processes.

The polyester compositions of the invention also show improved longevity in the applications of the paper manufacturing significantly lengthening the life of paper machine cloth and reducing production down time due to failure of the polyester belts.

This invention can be further illustrated by the following examples of preferred embodiments thereof, although it will be understood that these examples are included merely for purposes of illustration and are not intended to limit the scope of the invention unless otherwise specifically indicated. The starting materials are commercially available unless otherwise indicated.

EXAMPLES

For the examples below, the inherent viscosities of the polymers are determined in 60/40 (wt/wt) phenol/tetrachloroethane at a temperature of 25° C. and a concentration of 0.5 g/100 mL using a calibrated Ubbelohde viscometer at 25° C. The glass transition temperatures are determined using a DuPont 2200 Differential/scanning calorimeter at a scan rate of 20° C./min. The glycol content of the compositions is determined by proton nuclear magnetic resonance spectroscopy (NMR).

Example 1

This example illustrates the preparation of the homopolyester consisting of 100 mol % 2,6-naphthalenedicarboxylic acid units and 100 mol % ethylene glycol units.

A mixture of 244.0 g (1.00 mol) dimethyl 2,6-napthalenedicarboxylate, 119.7 g (1.93 mols) ethylene glycol, 0.048 g manganese acetate (55 ppm Mn), 0.117 g titanium tetraisopropoxide (100 ppm Ti), 0.047 g cobalt acetate (80 ppm Co) and 0.265 g Merpol A™ (110 ppm P) is placed in a 1-L flask equipped with an inlet for nitrogen, a metal stirrer, and a short distillation column. The flask is placed in a Belmont metal bath already heated to 190° C. and the contents of the flask are heated at 190° C. for about 3 hr. Then the temperature is raised progressively to 220° C. for about 2 hr, and then to 240° C. for about 45 min., The temperature is raised to 260° C. and a vacuum of 0.5 mm is gradually applied over the next 3–5 minutes while the temperature is raised to 300° C. Full vacuum is maintained for about 30 min. A high melt viscosity, crystalline polymer is obtained with an inherent viscosity of 0.56 and a melting endotherm measured by DSC at 255° C.

The polymer is ground to pass a 3-mm screen, dried, and blended with the appropriate polymeric carbodiimide at 295° C. in a twin screw extruder. The PEN/polymeric carbodiimide is spun into filament through a single hole capillary having length to diameter ratio of 3 (0.1-in wide by 0.3-in long) on an Instron 3211 Melt Rheometer at 310° C. The polymer had an I.V. of 0.52 dL/g after extrusion. The hydrolytic stability was tested by exposing the sample to water vapor in an autoclave at 121° C. and measuring the retention of tensile strength.

TABLE 1

| Composition | Carbodiimide, wt % | Days to 50% Tensile Strength Retention |
| --- | --- | --- |
| PET (Staboxal M) | 2 | 9 |
| N(EG) (control, no carbodiimide) | 0 | 14 |
| N(EG) (control, Staboxyl M) | 1 | 18 |
|  | 2 | 19 |
|  | 3 | 19 |
| N(EG) (Polymeric diimide C) | 1 | 21 |
|  | 2 | 23 |
| N(EG) (Polymeric diimide D) | 1 | 22 |
|  | 2 | 25 |
| N5(TPA)(EG) | 2 | 13 |
| N10(TPA)(EG) | 2 | 11 |

Polymeric carbodiimide C =

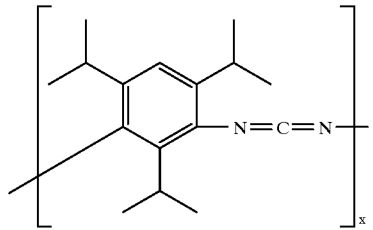

wherein x is 13.

Polymeric carbodiimide D =

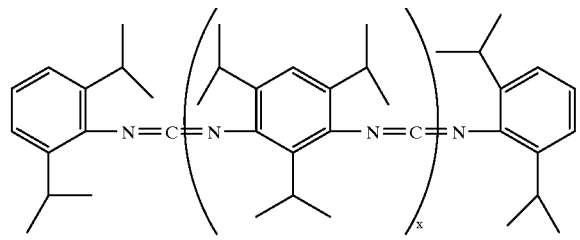

wherein x is 40.

PET=poly(ethylene terephthalate)
N=2,6-naphthalenedicarboxylic acid
TPA=terephthalic acid,
EG=ethylene glycol The invention has been described in detail with particular reference to preferred embodiments thereof, but it will be understood that variations and modifications can be effected within the spirit and scope of the invention. Moreover, all patents, patent applications (published and unpublished, foreign or domestic), literature references or other publications noted above are incorporated herein by reference for any disclosure pertinent to the practice of this invention.

We claim:

1. An article of paper machine fabric used in a papermaking machine which is essentially a fibrous structure comprising monofilament yarns wherein said monofilament yarns comprise a polyester composition further comprising:
   (A) 95 to 99.0% by weight of a polyester comprising from about 85 to 100 mole % of 2,6-naphthalenedicarboxylic acid and 85 to 100 mole % of at least one aliphatic glycol having from 2 to 16 carbon atoms, based on the total mole percentage for the glycol portion and for the acid portion of said polyester each equalling 100 mole %, and
   (B) 0.1 to 5.0% by weight of one or more polymeric carbodiimides.

2. The article of paper machine fabric of claim 1 wherein said polyester composition comprises:
   (A) 10 to 90.0% by weight of a polyester comprising from about 85 to 100 mole % of 2,6-naphthalenedicarboxylic acid and 85 to 100 mole % of at least one aliphatic glycol having from 2 to 16 carbon atoms, based on the total mole percentage for the glycol portion and for the acid portion of said polyester each equalling 100 mole %,
   (B) 0.1 to 5.0% by weight of one or more polymeric carbodiimides, and
   (C) 5 to 75.0% by weight of at least one terephthalate-based homopolymer, copolymer, or mixtures thereof.

3. The article of paper machine fabric of claim 1 or 2 with the proviso that said polymeric carbodiimides are not used in combination with mono-carbodiimides, bis-carbodiimides or mixtures thereof.

4. The article of paper machine fabric of claim 1 or 2 wherein said terephthalate-based homopolymer, copolymer or mixture thereof is selected from the group consisting of poly(ethylene terephthlate), poly(butylene terephthalate), and poly(cyclohexanedimethylene terephthalate).

5. The article of paper machine fabric of claim 1 or 2 wherein said terephthlate-based copolymer is selected from the group consisting of copolymers of poly(ethylene terephthlate), poly(butylene terephthalate), and poly(cyclohexanedimethylene terephthlate).

6. The article of paper machine fabric of claim 5 wherein said terephthlate-based copolymer is glycol-modified poly(ethylene terephthalate).

7. The article of paper machine fabric of claim 6 wherein said terephthalate-based copolymer is poly(ethylene terephthalate) modified with 1,4-cyclohexanedimethanol.

8. The article of paper machine fabric of claim 1 or 2 wherein component (B) is present in an amount of 0.1 to 3.0% by weight.

9. The article of paper machine fabric of claim 7 wherein said 1,4-cyclohexanedimethanol component of said poly(ethylene terephthalate)-based copolymer (C) is present in the amount of 1 to 50 mole %, based on the mole percentages of the components of said copolymer being equal to 100 mole %.

10. The article of paper machine fabric of claim 1 or 2 wherein said polyester composition comprises 90 to 100 mole % or more of said 2,6-naphthalenedicarboxylic acid and 100 to 90 mole % or more of said aliphatic glycol.

11. The article of paper machine fabric of claim 10 wherein said glycol is selected from the group consisting of ethylene glycol, and 1,4-cyclohexanedimethanol.

12. The article of paper machine fabric of claim 11 wherein said glycol is ethylene glycol.

13. The article of paper machine fabric of claim 12 wherein said ethylene glycol is present in the amount of at least 90 mole % based on the total mole percentage for the glycol portion equalling 100 mole %.

14. The article of paper machine fabric of claim 1 or 2 wherein said polyester has an inherent viscosity of from 0.5 to 1.5 dL/g.

15. The article of paper machine fabric of claim 1 or 2 wherein said polymeric carbodiimides have one of the following structures:

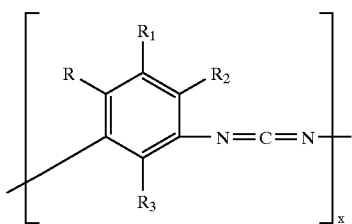

wherein R, $R_1$, $R_2$ and $R_3$ are selected from the group consisting of —H, —$CH_3$, —$CH_2CH_3$, —$CH_2CH_2CH_3$, —$CH(CH_3)_2$, —$C(CH_3)_3$, —$CH(CH_2CH_3)_2$, and —Cl, —$OCH_3$, and wherein x is from 2 to 80; or

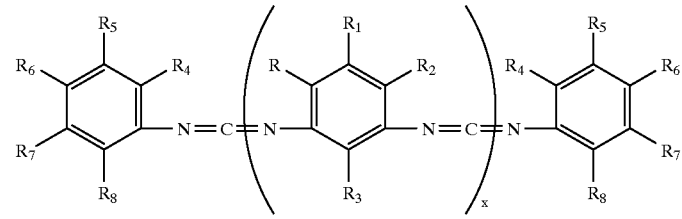

wherein R, $R_1$, $R_2$, $R_3$, $R_4$, $R_5$, $R_6$, $R_7$ and $R_8$ are selected from the group consisting of —H, —$CH_3$, —$CH_2CH_3$, —$CH_2CH_2CH_3$, —$CH(CH_3)_2$, —$C(CH_3)_3$, —CH$(CH_2CH_3)_2$, —Cl, and —$OCH_3$, and wherein x is 2 to 80.

16. The polyester composition of claim 15 wherein said polymeric carbodiimides have the following structure:

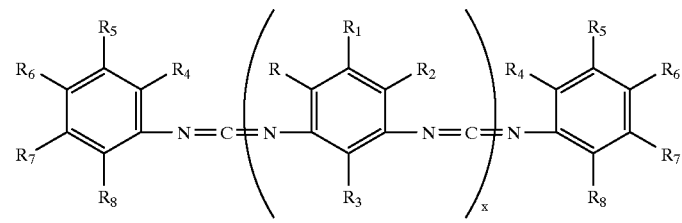

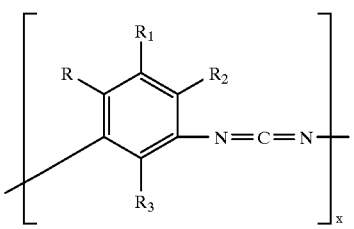

wherein R, $R_1$, $R_2$ and $R_3$ are selected from the group consisting of —H, —$CH_3$, —$CH_2CH_3$, —$CH_2CH_2CH_3$, $CH(CH_3)_2$, $C(CH_3)_3$, —$CH(CH_2CH_3)_2$, and —Cl, —$OCH_3$.

17. The polyester composition of claim 16 wherein at least one of R, $R_1$, $R_2$, and $R_3$ is —$CH(CH_3)_2$.

18. The polyester composition of claim 17 wherein at least one of said polymeric carbodiimides have the following structure:

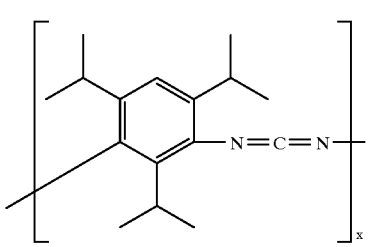

wherein x is 13.

19. The polyester composition of claim 15 wherein at least one of said polymeric carbodiimides have the following structure:

wherein R, $R_1$, $R_2$, $R_3$, $R_4$, $R_5$, $R_6$, $R_7$ and $R_8$ are selected from the group consisting of —H, —$CH_3$, —$CH_2CH_3$, $CH_2CH_2CH_3$, $CH(CH_3)_2$, $C(CH_3)_3$, —$CH(CH_2CH_3)_2$, —Cl, and —$OCH_3$, and wherein x is from 20 to 60.

20. The polyester composition of claim 19 wherein at least one of R, $R_1$, $R_2$, $R_3$, $R_4$, $R_5$, $R_6$, $R_7$ and $R_8$ are —CH$(CH_3)_2$.

21. The polyester composition of claim 20 wherein said polymeric carbodiimide has the following structure:

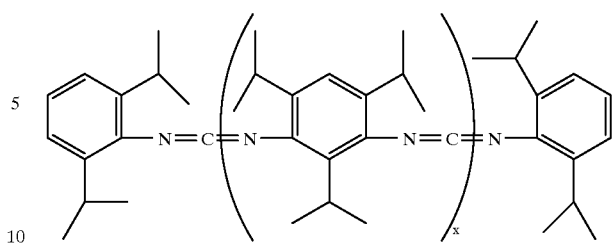

wherein x is 40.

* * * * *

UNITED STATES PATENT AND TRADEMARK OFFICE
CERTIFICATE OF CORRECTION

PATENT NO. : 5,910,363
DATED : June 8, 1999
INVENTOR(S) : Martin Emerson Rogers, Sarah Jayne Webb It is certified that error appears in the above-identified patent and that said Letters Patent is hereby corrected as shown below:

Item [62] on the first page should read "Division of application No. 08/866,468, May 30, 1997, which is a file wrapper continuation of application No. 08/459,560, June 2, 1995."

Signed and Sealed this

Eleventh Day of April, 2000

Attest:

Q. TODD DICKINSON

Attesting Officer

Director of Patents and Trademarks